United States Patent
Li et al.

(10) Patent No.: US 11,987,513 B2
(45) Date of Patent: May 21, 2024

(54) METHOD FOR SYNERGISTIC DEGRADATION TREATMENT OF POLYSACCHARIDE-CONTAINING POLYMER WASTEWATER BY CONTROLLABLE—OH RADICAL

(71) Applicant: XI'AN SHIYOU UNIVERSITY, Shaanxi (CN)

(72) Inventors: Jinling Li, Shaanxi (CN); Tao Yu, Shaanxi (CN); Bo Yang, Shaanxi (CN); Chengtun Qu, Shaanxi (CN)

(73) Assignee: XI'AN SHIYOU UNIVERSITY (CN)

( * ) Notice: Subject to any disclaimer, the term of this patent is extended or adjusted under 35 U.S.C. 154(b) by 565 days.

(21) Appl. No.: 17/421,626

(22) PCT Filed: Jul. 3, 2020

(86) PCT No.: PCT/CN2020/100112
§ 371 (c)(1),
(2) Date: Jul. 8, 2021

(87) PCT Pub. No.: WO2021/000930
PCT Pub. Date: Jan. 7, 2021

(65) Prior Publication Data
US 2022/0127171 A1 Apr. 28, 2022

(30) Foreign Application Priority Data
Jul. 4, 2019 (CN) .......................... 201910600881.3

(51) Int. Cl.
*C02F 1/76* (2023.01)
*C02F 1/00* (2023.01)
*C02F 1/52* (2023.01)
C02F 101/34 (2006.01)
C02F 103/10 (2006.01)

(52) U.S. Cl.
CPC ................ *C02F 1/76* (2013.01); *C02F 1/004* (2013.01); *C02F 1/5245* (2013.01); *C02F 2001/007* (2013.01); *C02F 2101/34* (2013.01); *C02F 2103/10* (2013.01); *C02F 2209/02* (2013.01); *C02F 2209/08* (2013.01); *C02F 2209/09* (2013.01); *C02F 2209/10* (2013.01); *C02F 2303/02* (2013.01); *C02F 2305/023* (2013.01)

(58) Field of Classification Search
None
See application file for complete search history.

(56) References Cited

FOREIGN PATENT DOCUMENTS

| | | |
|---|---|---|
| CN | 101302065 A | 11/2008 |
| CN | 104045179 B | 9/2014 |
| CN | 104343032 B | 2/2015 |
| CN | 104445700 A | 3/2015 |
| CN | 104556486 A | 4/2015 |
| CN | 105540964 B | 5/2016 |
| CN | 106045145 A | 10/2016 |
| CN | 106186436 A | 12/2016 |
| CN | 108483707 A | 9/2018 |
| CN | 109231619 A | 1/2019 |
| CN | 110342678 A | 10/2019 |
| JP | 6168194 A | 4/1986 |

OTHER PUBLICATIONS

International Search Report of International Application No. PCT/CN2020/100112, mailed Oct. 13, 2020.

*Primary Examiner* — Peter Keyworth
(74) *Attorney, Agent, or Firm* — Kim IP Law Group LLC

(57) ABSTRACT

The present disclosure relates to the technical field of wastewater treatment in oil and gas field operations, in particular to a method for synergistic degradation treatment of polysaccharide-containing polymer wastewater by controllable —OH radical. In this method, a ferrous ion solution, an alkaline solution, and an oxidant solution are mixed and heated to generate —OH radicals, —O radicals and polymeric iron ions, etc., which then is mixed with polysaccharide-containing polymer wastewater. The generated highly oxidative —OH radicals and —O radicals react with polysaccharide polymers so that they are degraded. The generated polymeric iron ions form flocs that purify the suspended solids in the wastewater. The purified polysaccharide-containing polymer wastewater can be re-injected or reused as an oilfield working fluid. In the present disclosure, the polysaccharide-containing polymer wastewater can be treated in a quick and efficient manner, and the treated wastewater can be recycled.

11 Claims, No Drawings

METHOD FOR SYNERGISTIC DEGRADATION TREATMENT OF POLYSACCHARIDE-CONTAINING POLYMER WASTEWATER BY CONTROLLABLE—OH RADICAL

CROSS REFERENCE TO RELATED APPLICATION

This application claims the benefit and priority of Chinese Patent Application No. CN201910600881.3, entitled "Method For Synergistic Degradation Treatment Of Polysaccharide-Containing Polymer Wastewater by Controllable —OH Radical" filed on Jul. 4, 2019, the disclosure of which is incorporated by reference herein in its entirety as part of the present application.

TECHNICAL FIELD

The present disclosure relates to the technical field of wastewater treatment in oil and gas field operations, in particular to a method for treating polysaccharide-containing polymer wastewater.

BACKGROUND ART

In oilfield production, polysaccharide-containing polymers are often used as drilling fluid additives or fracturing fluid additives for the needs of drilling and reservoir reconstruction. After the completion of the operation, polysaccharide-containing polymer wastewater will be produced, which is characterized by high viscosity, high COD value, and the like. Since the polysaccharide polymers contained in this type of wastewater are susceptible to microbial influences, deteriorate and stink, their treatment and reuse is one of the important tasks in oilfield environmental protection. In order to make this type of wastewater a resource and non-hazardous, scientific and technological workers began to use gel breaking/flocculation combined treatment technology to treat wastewater in the 1990s.

CN 105540964B discloses a method for degrading guar gum in fracturing wastewater by using potassium ferrate and ultrasonic-assisted coupling, which is carried out according to the following steps: Step 1: the fracturing wastewater is allowed to stand and separated to obtain a clear solution; Step 2: absolute ethanol is added to the clear solution for purification; Step 3: an alkali regulator is added to the purified guar gum solution to adjust the pH; Step 4: a potassium ferrate aqueous solution is added, and at the same time, the mixture is subjected to ultrasonic-assisted oxidation to obtain a qualified fracturing fluid flowback. This disclosure uses potassium ferrate to deeply oxidize the guar gum in the fracturing wastewater with the assistance of ultrasonic field, and realizes deep oxidation of guar gum through the coupling effect of oxidant and external field force, and effectively reduces the $COD_{Cr}$ value and viscosity of the fracturing wastewater.

CN 101302065B discloses a method for treating fracturing wastewater in oil and gas fields, including the following steps: pH adjustment with raw water, $H_2O_2/Fe^{2+}$ catalytic oxidation, chemical precipitation, enhanced flocculation precipitation, filtration by elaborate filter and adsorption, and systematic mud sedimentation and dehydration by pressure filtration, wherein the filtrate is reprocessed by returning to the front end, and the mud cake is dried to make bricks or treated by an incineration process. The water quality is qualified for re-injection or meets Class II standards of China Integrated Wastewater Discharge Standard GB8978-1996.

CN 104045179B discloses a method and a device for processing fracturing fluid flowback in oil and gas fields. The filtered fracturing fluid flowback is conveyed to a tubular reactor, and then a primary oxidant and a secondary oxidant are added for coupling operation and again stirred uniformly. Subsequently, a mixture of coagulant and flocculant is added to the obtained mixed solution and stirred thoroughly. The resulting viscous material is conveyed to a separator to separate oil, wastewater and mud fluid mixture, wherein the oil floats automatically to the top of the mixture, and is discharged through an oil discharge device near the top of the separator, the mud fluid deposited at the bottom of the separator is discharged into a mud tank through a pipeline, and the wastewater suspended in the middle is discharged into a buffer tank through a pipeline.

CN 104343032B relates to a method for the coagulation treatment of a high-viscosity fracturing wastewater in low-permeability oilfields. During treatment of the high-viscosity fracturing wastewater, the addition amount of the components of the coagulant is 500 to 1000 mg/L of polyaluminum chloride, 50 to 100 mg/L of potassium carbonate, 1000 to 3000 mg/L of 80- to 100-mesh loessial soil, and 7 to 15 mg/L of polyacrylamide, respectively. The order of addition is loessial soil, polyaluminum chloride, potassium carbonate, and polyacrylamide. The coagulation time is controlled within 30 minutes; the amount of mud is within 10%; and the supernatant SS after treatment is controlled below 10 mg/L. This method can be used to treat a high-viscosity fracturing wastewater with a viscosity of >5 mPa·s, and overcomes the disadvantages of conventional coagulation, i.e., the failure to effectively remove the impurities of high-viscosity fracturing wastewater, the float of flocs which are not easy to sink, and the large mud volume.

CN 104445700A relates to a method for the treatment and reuse of guar gum fracturing wastewater. Potassium hydroxide and sodium carbonate are added first, stirred for 5 to 10 minutes; then a polyacrylamide solution is added; and finally, oxalic acid is added to the treated water within 2 hours before reuse to adjust the pH to 6 to 7.5. The addition amount of the treating agents is: 500 to 1000 mg/L of potassium hydroxide, 200 to 300 mg/L of sodium carbonate, 5 to 15 mg/L of polyacrylamide, and 300 to 500 mg/L of oxalic acid. After wastewater is treated by the method, the removal rate of suspended solids in the wastewater is above 85%; the concentration of high-valent ions such as iron, calcium, magnesium, and the like in the treated water is less than 300 mg/L; and the number of bacterial microorganisms is less than 100 per liter, which meets the requirements for reuse.

CN 104556486A provides a method for treating fracturing wastewater in oil and gas extraction. The treatment method includes the following steps: Polyaluminum chloride and polyacrylamide are added to the oil and gas extraction fracturing wastewater to be treated, stirred and allowed to stand to separate the supernatant; the separated supernatant is reacted in the presence of hydrogen peroxide at 260 to 340° C. and 8 to 15 MPa for 15 to 75 minutes to obtain a treated oil and gas extraction fracturing wastewater. The COD removal rate is above 90%; after standing, the COD value is reduced to below 100 mg/L, which meets the Class I standards of Wastewater Discharge Standard (GB8978-1996).

CN 106045145A provides a method and a device for treating fracturing wastewater in an oil and gas field, which can meet the needs of different purposes for the treatment of fracturing wastewater. The treatment method includes the following steps: The fracturing wastewater is successively subjected to chemical oxidation, electro-flocculation, and primary filtration; the wastewater after the primary filtration is subjected to three-dimensional electrocatalytic oxidation; the wastewater after the three-dimensional electrocatalytic oxidation is subjected to fine filtration to obtain a liquid that meets the standards for the preparation of a fracturing fluid.

SUMMARY

It is an object of the present disclosure to provide a method for synergistic degradation treatment of polysaccharide-containing polymer wastewater by controllable —OH radical. The method provided by the present disclosure can quickly, efficiently and conveniently make the polysaccharide-containing polymer wastewater a resource and non-hazardous.

In order to solve the above technical problem, the present disclosure employs the following technical solutions:

A method for synergistic degradation treatment of polysaccharide-containing polymer wastewater by controllable —OH radical is provided, including the following steps: A ferrous ion solution, an alkaline solution, and an oxidant solution are conveyed to a tubular reactor with a heating device through a metering pump connected thereto; after reacting at 45 to 70° C. for 30 to 90 seconds, the resulting reaction solution is immediately pumped into a reactor with a stirring device, together with polysaccharide-containing polymer wastewater, and reacts for 20 to 40 minutes under stirring; subsequently, the mixture settles in a sedimentation pond, is filtered by a filter, and then enters a clean water tank.

Preferably, the ferrous ion solution is an aqueous solution of ferrous sulfate with a mass concentration of 10 to 20% or an aqueous solution of ferrous chloride with a mass concentration of 10 to 20%.

Preferably, the alkaline solution is an aqueous solution of sodium hydroxide with a mass concentration of 10% to 15% or an aqueous solution of potassium hydroxide with a mass concentration of 10% to 15%.

Preferably, the oxidant solution is an aqueous solution of sodium hypochlorite with a mass concentration of 10% to 15% or an aqueous solution of sodium chlorite with a mass concentration of 10% to 15%.

Preferably, the volume ratio of the ferrous ion solution, the alkaline solution, and the oxidant solution is 1:(1 to 1.5):(2 to 4).

Preferably, the volume ratio of the reaction solution to the polysaccharide-containing polymer wastewater is (8 to 12): 100.

Preferably, the polysaccharide-containing polymer wastewater is wastewater generated from oilfield fracturing operations or wastewater from oilfield drilling, and the polysaccharide-containing polymer wastewater has a viscosity of 5 to 30 mPa·s, a chroma of 100 to 200 degrees, a COD of 1500 to 5000 mg/L, a suspended solids content of 30 to 200 mg/L;

The polysaccharide polymer is any one or more selected from a polymer formed by cross-linking guar gum and organoboron, a polymer formed by cross-linking Sesbania gum and organoboron, and carboxymethyl cellulose.

Preferably, the filter is a system formed by connecting a quartz sand filter and a modified fiber ball filter in series, and the particle size of the filter material of the quartz sand filter is 0.3 to 0.5 mm.

The present disclosure provides a method for synergistic degradation treatment of polysaccharide-containing polymer wastewater by controllable —OH radical, including the following steps: A ferrous ion solution, an alkaline solution, and an oxidant solution are conveyed to a tubular reactor with a heating device through a metering pump connected thereto; after reacting at 45 to 70° C. for 30 to 90 seconds, the resulting reaction solution is immediately pumped into a reactor with a stirring device, together with polysaccharide-containing polymer wastewater, and reacts for 20 to 40 minutes under stirring; subsequently, the mixture settles in a sedimentation pond, is filtered by a filter, and then enters a clean water tank. The beneficial effects of the technical solution provided by the present disclosure are as follows: (1) In the present disclosure, an oxidant (such as sodium hypochlorite or sodium chlorite) is decomposed by divalent iron under alkaline conditions to achieve a controllable formation of —OH radicals and —O radicals, which oxidatively degrade the polysaccharide-containing polymer wastewater. Hydroxide precipitates formed by the remaining divalent iron under alkaline conditions are used to adsorb and wrap suspended solids in the wastewater to purify the polysaccharide-containing polymer wastewater. In the present disclosure, ferric iron formed from divalent iron with sodium hypochlorite or sodium chlorite can be immediately reacted with fresh sodium hypochlorite or sodium chlorite to generate nascent ferrate, avoiding the problem that the synthesized ferrate is decomposed in the wastewater and results in reduced treatment effect. (2) In the present disclosure, the generation of —OH radicals and —O radicals can be controlled by adjusting the addition amount and speed of the agents, thereby improving the efficiency of oxidation treatment; meanwhile, the polymerized iron generated from iron can be directly used as a flocculant, integrating the oxidation process and the flocculation process, which reduces processing procedures and improves processing efficiency. (3) In the present disclosure, the wastewater after oxidation and flocculation treatments is filtered through a filter (such as a system formed by connecting a quartz sand filter and a modified fiber ball filter in series), and can be re-injected or reused as a working fluid. (4) The subject to be treated in the present disclosure is oilfield fracturing or drilling wastewater containing polysaccharide polymers.

DETAILED DESCRIPTION OF THE EMBODIMENTS

The present disclosure is further described below in conjunction with examples.

The present disclosure provides a method for synergistic degradation treatment of polysaccharide-containing polymer wastewater by controllable —OH radical, including the following steps: A ferrous ion solution, an alkaline solution, and an oxidant solution are conveyed to a tubular reactor with a heating device through a metering pump connected thereto; after reacting at 45 to 70° C. for 30 to 90 seconds, the resulting reaction solution is immediately pumped into a reactor with a stirring device, together with polysaccharide-containing polymer wastewater, and reacts for 20 to 40 minutes under stirring; subsequently, the mixture settles in a sedimentation pond, is filtered by a filter, and then enters a clean water tank.

In the present disclosure, the ferrous ion solution is preferably an aqueous solution of ferrous sulfate with a mass concentration of 10% to 20% or an aqueous solution of ferrous chloride with a mass concentration of 10% to 20%; the mass concentration of the aqueous solution of ferrous sulfate is more preferably 18%.

In the present disclosure, the alkaline solution is preferably an aqueous solution of sodium hydroxide with a mass concentration of 10% to 15% or an aqueous solution of potassium hydroxide with a mass concentration of 10% to 15%.

In the present disclosure, the oxidant solution is preferably an aqueous solution of sodium hypochlorite with a mass concentration of 10% to 15% or an aqueous solution of sodium chlorite with a mass concentration of 10% to 15%; the mass concentration of the aqueous solution of sodium hypochlorite is more preferably 10.5%; the mass concentration of the aqueous solution of sodium chlorite is more preferably 10.5 to 12.5%.

In the present disclosure, the volume ratio of the ferrous ion solution, the alkaline solution, and the oxidant solution is preferably 1:(1 to 1.5):(2 to 4), more preferably 1:1.5:2, 1:1.3:2.5, 1:1:3 or 1:1.5:4.

In the present disclosure, the volume ratio of the reaction solution to the polysaccharide-containing polymer wastewater is (8 to 12):100, more preferably 1:10.

In the present disclosure, the polysaccharide-containing polymer wastewater is preferably wastewater generated from oilfield fracturing operations or wastewater from oilfield drilling; the viscosity of the polysaccharide-containing polymer wastewater is preferably 5 to 30 mPa·s; the chroma of the polysaccharide-containing polymer wastewater is preferably 100 to 200 degrees, more preferably 120 to 170 degrees; the COD of the polysaccharide-containing polymer wastewater is preferably 1500 to 5000 mg/L, more preferably 2000 to 4500 mg/L, most preferably 3000 to 4000 mg/L; the suspended solids content of the polysaccharide-containing polymer wastewater is preferably 30 to 200 mg/L, more preferably 65 to 150 mg/L, most preferably 130 mg/L. In the present disclosure, the polysaccharide polymer is preferably any one or more selected from a polymer formed by cross-linking guar gum and organoboron, a polymer formed by cross-linking Sesbania gum and organoboron, and carboxymethyl cellulose.

In the present disclosure, the temperature of the reaction that is carried out at 45 to 70° C. for 30 to 90 seconds is more preferably 50 to 60° C., and the time is more preferably 70 seconds.

In the present disclosure, the sedimentation pond is a flat flow sedimentation pond or a sedimentation tank, more preferably a flat flow sedimentation pond, and the sedimentation time is preferably 10 to 120 minutes, more preferably 15 to 40 minutes.

In the present disclosure, the filter is preferably a system formed by connecting a quartz sand filter and a modified fiber ball filter in series, and the particle size of the filter material of the quartz sand filter is preferably 0.3 to 0.5 mm.

The method for synergistic degradation treatment of polysaccharide-containing polymer wastewater by controllable —OH radical provided by the present disclosure is described in detail below in conjunction with examples, but they should not be understood as limiting the protection scope of the present disclosure.

Example 1

The treatment of guar gum-based oilfield fracturing wastewater, having a viscosity of 30 mpa·s, a chroma of 200 degrees, a COD of 3500 mg/L, and a suspended solids content of 170 mg/L, is used as example. The specific treatment method is as follows:

1 L of an aqueous solution of ferrous sulfate with a mass concentration of 20%, 1.5 of aqueous solution of sodium hydroxide with a mass concentration of 10%, and 2 L of an aqueous solution of sodium hypochlorite with a mass concentration of 10.5% are conveyed to a tubular reactor with a heating device through a metering pump connected thereto; after reacting at 70° C. for 30 seconds, the resulting reaction solution is immediately pumped into a reactor with a stirring device, together with 45 L of guar gum-based fracturing fluid flowback, and oxdatively reacts for 40 minutes under stirring. After the completion of the reaction, the mixture settles in a sedimentation pond for 20 minutes, is filtered by a quartz sand filter with a particle size of filter material of 0.5 mm and a modified fiber ball filter, and then enters a clean water tank. After testing, the treated water has a viscosity of 1.1 mpa·s, a chroma of below 20 degrees, a COD of 450 mg/L, and a suspended solids content of 9.0 mg/L, and the water quality is qualified for re-injection in oilfields.

Example 2

The treatment of oilfield drilling wastewater containing carboxymethylcellulose, having a viscosity of 28 mpa·s, a chroma of 170 degrees, a COD of 1500 mg/L, and a suspended solids content of 130 mg/L, is used as example. The specific treatment method is as follows:

1 L of an aqueous solution of ferrous sulfate with a mass concentration of 20%, 1.3 L of an aqueous solution of sodium hydroxide with a mass concentration of 10%, and 2.5 L of an aqueous solution of sodium hypochlorite with a mass concentration of 10.5% are conveyed to a tubular reactor with a heating device through a metering pump connected thereto; after reacting at 60° C. for 70 seconds, the resulting reaction solution is immediately pumped into a reactor with a stirring device, together with 50 L of oilfield drilling wastewater containing carboxymethylcellulose, and oxdatively reacts for 40 minutes under stirring. After the completion of the reaction, the mixture settles in a sedimentation pond for 30 minutes, is filtered by a quartz sand filter with a particle size of filter material of 0.3 mm and a modified fiber ball filter, and then enters a clean water tank. After testing, the treated water has a viscosity of 0.98 mpa·s, a chroma of below 20 degrees, a COD of 350 mg/L, and a suspended solids content of 6.0 mg/L, and the water quality is qualified for re-injection in oilfields.

Example 3

The treatment of fracturing wastewater containing guar gum, having a viscosity of 18 mpa·s, a chroma of 170 degrees, a COD of 1500 mg/L, and a suspended solids content of 130 mg/L, is used as example. The specific treatment method is as follows:

1 L of an aqueous solution of ferrous sulfate with a mass concentration of 18%, 1 L of an aqueous solution of potassium hydroxide with a mass concentration of 10.5%, and 3 L of an aqueous solution of sodium hypochlorite with a mass concentration of 12.5% are conveyed to a tubular reactor with a heating device through a metering pump connected thereto; after reacting at 50° C. for 90 seconds, the resulting reaction solution is immediately pumped into a reactor with a stirring device, together with 50 L of fracturing wastewater containing guar gum, and oxdatively reacts for 40 minutes under stirring. After the completion of the reaction, the mixture settles in a sedimentation pond for 20 minutes, is filtered by a quartz sand filter with a particle size of filter material of 0.3 mm and a modified fiber ball filter, and then enters a clean water tank. After testing, the treated water has a viscosity of 1.05 mpa·s, a chroma of below 20 degrees, a COD of 350 mg/L, and a suspended solids content of 6.0 mg/L, and the water quality is qualified for re-injection in oilfields.

Example 4

The treatment of oilfield drilling wastewater containing carboxymethylcellulose, having a viscosity of 10 mpa·s, a chroma of 120 degrees, a COD of 1800 mg/L, and a suspended solids content of 95 mg/L, is used as example. The specific treatment method is as follows:

1 L of an aqueous solution of ferrous sulfate with a mass concentration of 10%, 1.5 L of an aqueous solution of potassium hydroxide with a mass concentration of 10%, and 4 L of an aqueous solution of sodium hypochlorite with a mass concentration of 10.5% are conveyed to a tubular reactor with a heating device through a metering pump connected thereto; after reacting at 50° C. for 90 seconds, the resulting reaction solution is immediately pumped into a reactor with a stirring device, together with 65 L of oilfield drilling wastewater containing carboxymethylcellulose, and oxdatively reacts for 40 minutes under stirring. After the completion of the reaction, the mixture settles in a sedimentation pond for 15 minutes, is filtered by a quartz sand filter with a particle size of filter material of 0.5 mm and a modified fiber ball filter, and then enters a clean water tank. After testing, the treated water has a viscosity of 0.95 mpa·s, a chroma of below 20 degrees, a COD of 380 mg/L, and a suspended solids content of 5.0 mg/L, and the water quality is qualified for re-injection in oilfields.

The description of the above examples is only used to help understand the method and the core idea of the present disclosure. It should be pointed out that for those of ordinary skill in the art, without departing from the principles of the present disclosure, improvements and modifications can be made to the present disclosure, and these improvements and modifications also fall within the protection scope of the claims of the present disclosure. Modifications to the examples are obvious to those skilled in the art, and the general principles defined herein can be implemented in other examples without departing from the spirit or scope of the present disclosure. Therefore, the present disclosure will not be limited to the examples as described herein, but should conform to the widest scope consistent with the principles and novel features as disclosed herein.

What is claimed is:

1. A method for synergistic degradation treatment of polysaccharide-containing polymer wastewater by controllable —OH radical, characterized by including the following steps: a ferrous ion solution, an alkaline solution, and an oxidant solution are conveyed to a tubular reactor with a heating device through a metering pump connected thereto; after reacting at 45 to 70° C. for 30 to 90 seconds, the resulting reaction solution is immediately pumped into a reactor with a stirring device, together with polysaccharide-containing polymer wastewater, and reacts for 20 to 40 minutes under stirring; subsequently, the mixture settles in a sedimentation pond, is filtered by a filter, and then enters a clean water tank.

2. The method for synergistic degradation treatment of polysaccharide-containing polymer wastewater by controllable —OH radical according to claim 1, wherein the ferrous ion solution is an aqueous solution of ferrous sulfate with a mass concentration of 10 to 20% or an aqueous solution of ferrous chloride with a mass concentration of 10 to 20%.

3. The method for synergistic degradation treatment of polysaccharide-containing polymer wastewater by controllable —OH radical according to claim 2, wherein the volume ratio of the ferrous ion solution, the alkaline solution, and the oxidant solution is 1:(1 to 1.5):(2 to 4).

4. The method for synergistic degradation treatment of polysaccharide-containing polymer wastewater by controllable —OH radical according to claim 1, wherein the alkaline solution is an aqueous solution of sodium hydroxide with a mass concentration of 10% to 15% or an aqueous solution of potassium hydroxide with a mass concentration of 10% to 15%.

5. The method for synergistic degradation treatment of polysaccharide-containing polymer wastewater by controllable —OH radical according to claim 4, wherein the volume ratio of the ferrous ion solution, the alkaline solution, and the oxidant solution is 1:(1 to 1.5):(2 to 4).

6. The method for synergistic degradation treatment of polysaccharide-containing polymer wastewater by controllable —OH radical according to claim 1, wherein the oxidant solution is an aqueous solution of sodium hypochlorite with a mass concentration of 10% to 15% or an aqueous solution of sodium chlorite with a mass concentration of 10% to 15%.

7. The method for synergistic degradation treatment of polysaccharide-containing polymer wastewater by controllable OH radical according to claim 6, wherein the volume ratio of the ferrous ion solution, the alkaline solution, and the oxidant solution is 1:(1 to 1.5):(2 to 4).

8. The method for synergistic degradation treatment of polysaccharide-containing polymer wastewater by controllable —OH radical according to claim 1, wherein the volume ratio of the ferrous ion solution, the alkaline solution, and the oxidant solution is 1:(1 to 1.5):(2 to 4).

9. The method for synergistic degradation treatment of polysaccharide-containing polymer wastewater by controllable —OH radical according to claim 1, wherein the volume ratio of the reaction solution to the polysaccharide-containing polymer wastewater is (8 to 12):100.

10. The method for synergistic degradation treatment of polysaccharide-containing polymer wastewater by controllable —OH radical according to claim 1, wherein the polysaccharide-containing polymer wastewater is wastewater generated from oilfield fracturing operations or wastewater from oilfield drilling, and the polysaccharide-containing polymer wastewater has a viscosity of 5 to 30 mPa·s, a chroma of 100 to 200 degrees, a COD of 1500 to 5000 mg/L, a suspended solids content of 30 to 200 mg/L;
the polysaccharide polymer is any one or more selected from a polymer formed by cross-linking guar gum and organoboron, a polymer formed by cross-linking Sesbania gum and organoboron, and carboxymethyl cellulose.

11. The method for synergistic degradation treatment of polysaccharide-containing polymer wastewater by controllable —OH radical according to claim 1, wherein the filter is a system formed by connecting a quartz sand filter and a modified fiber ball filter in series, and the particle size of the filter material of the quartz sand filter is 0.3 to 0.5 mm.

* * * * *